(12) United States Patent
Feile

(10) Patent No.: US 6,312,057 B1
(45) Date of Patent: Nov. 6, 2001

(54) STRUCTURAL COMPONENT CONSISTING OF A BELT BUCKLE, ATTACHMENT HARDWARE AND FORCE LIMITER

(75) Inventor: Herbert Feile, Schwäbisch Gmünd (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/380,919

(22) PCT Filed: Dec. 17, 1998

(86) PCT No.: PCT/EP98/08305

§ 371 Date: Sep. 9, 1999

§ 102(e) Date: Sep. 9, 1999

(87) PCT Pub. No.: WO99/37509

PCT Pub. Date: Jul. 29, 1999

(30) Foreign Application Priority Data

Jan. 20, 1998 (DE) .......................... 298 00 909 U

(51) Int. Cl.⁷ ............................ A47C 31/00; B60R 22/28
(52) U.S. Cl. ........................ 297/471; 297/472; 280/805
(58) Field of Search .................................. 297/472, 470, 297/471; 280/805

(56) References Cited

U.S. PATENT DOCUMENTS

| | | |
|---|---|---|
| 3,280,942 | 10/1966 | Millington . |
| 4,674,801 | 6/1987 | DiPaola et al. . |
| 5,005,909 * | 4/1991 | Fohl ................................... 297/472 |
| 5,113,981 | 5/1992 | Lantz . |
| 5,340,152 * | 8/1994 | Fohl ................................... 297/472 |
| 5,692,805 * | 12/1997 | Nishide et al. ...................... 297/472 |
| 6,039,352 * | 3/2000 | Wier ................................ 297/472 X |
| 6,039,353 * | 3/2000 | Bauer et al. .................... 297/472 X |
| 6,068,297 * | 5/2000 | Weller .............................. 297/472 X |

FOREIGN PATENT DOCUMENTS

| | | | |
|---|---|---|---|
| 248895 * | 8/1966 | (DE) | .................................. 297/472 |
| 1531516 | 12/1969 | (DE) | . |
| 2518654 * | 11/1975 | (DE) | .................................. 297/472 |
| 2621983 | 12/1977 | (DE) | . |
| 3723772 | 2/1989 | (DE) | . |
| 3834922 | 5/1989 | (DE) | . |
| 3900066 | 7/1989 | (DE) | . |
| 2273692 | 1/1976 | (FR) | . |
| 2367510 | 5/1978 | (FR) | . |

* cited by examiner

Primary Examiner—Anthony D. Barfield
(74) Attorney, Agent, or Firm—Tarolli, Sundheim, Covell, Tummino & Szabo L.L.P.

(57) ABSTRACT

An assembly unit comprising a belt buckle (10) for the insert tongue of a vehicular seat belt, a fastener fitting (12) for the belt buckle (10) and a force limiter between the belt buckle (10) and the fastener fitting (12) is characterized in that the force limiter contains a traction means (14, 16) fixedly connected to the belt buckle (10), movable relative to the fastener fitting (12) by a predetermined travel, and a stretchable member (24) coupled to the belt buckle (10) and the fastener fitting (12), which can be stretched by a predetermined tensile force between the belt buckle (10) and the fastener fitting (12) being exceeded.

6 Claims, 2 Drawing Sheets

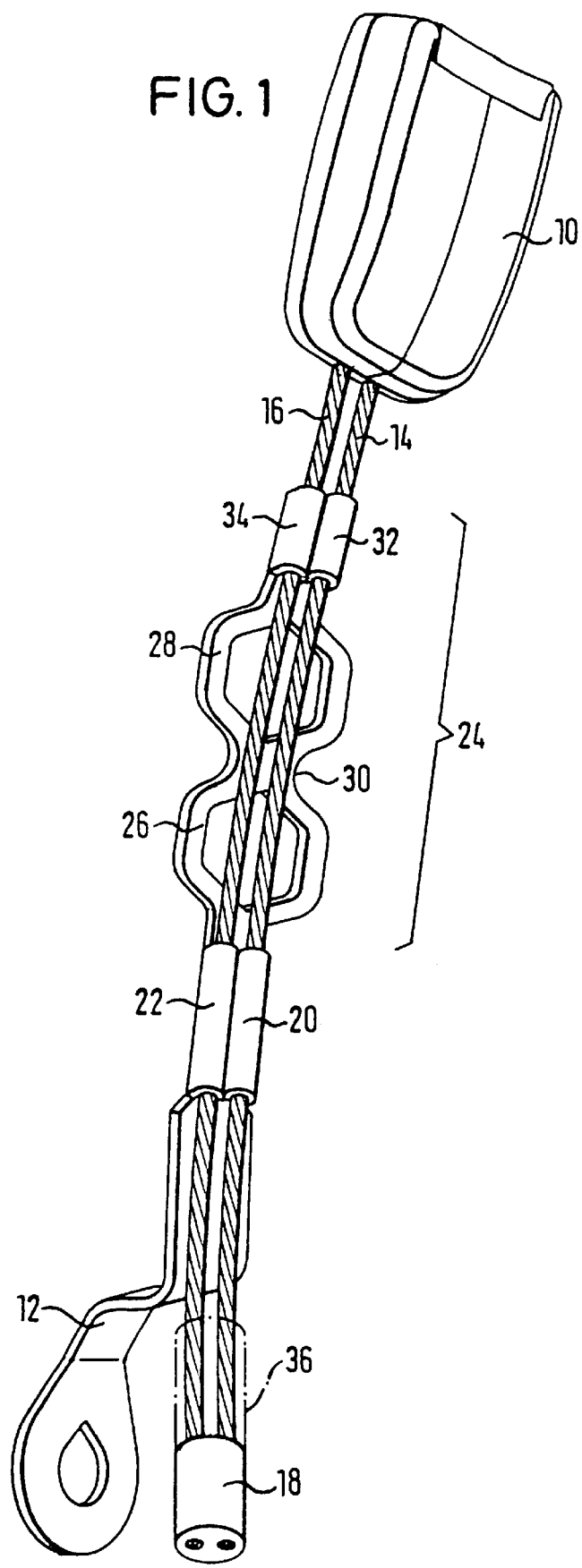

STRUCTURAL COMPONENT CONSISTING OF A BELT BUCKLE, ATTACHMENT HARDWARE AND FORCE LIMITER

The invention relates to an assembly unit comprising a belt. buckle for the insert tongue of a vehicular seat belt, a fastener fitting for the belt buckle and a force limiter between the belt buckle and the fastener fitting.

One such assembly unit is known from the German laid-open publication 37 23 772. In this known assembly unit, the force limiter is formed by a stretchable member which is configured integrally with the fastener fitting serving to secure the belt buckle to the vehicle and which is provided with a retaining lug for the belt buckle at its end facing away from the fastener fitting. The stretchable member consists of several annular stretch links integrally connected to each other, which are stretched once a predetermined tensile load between the belt buckle and the fastener fitting is exceeded. The resulting increase in length between the fastener fitting and the belt buckle limits the maximum force acting in the vehicular seat belt. Arranged in the interior of the annular stretch links are protruding limiting elements which, beyond a predetermined extension, come into contact with each other thus limiting any further increase in length of the stretchable member.

The drawback of this known assembly unit is that the characteristic of increase in length versus effective tensile force cannot be adjusted independently of the maximum tensile load required to be transmitted by the assembly unit.

The invention provides an assembly unit comprising a belt buckle, a fastener fitting and a force limiter in which the characteristic of the increase in length relative to the effective tensile force can be arbitrarily adapted to the respective requirements without influencing the maximum permissible tensile load transmittable between the belt buckle and the fastener fitting. In accordance with the invention, provision is made in an assembly unit of the aforementioned kind that the force limiter contains a traction means fixedly connected to the belt buckle and movable relative to the fastener fitting by a predetermined travel, and a stretchable member coupled to the belt buckle and the fastener fitting which member can be stretched by a predetermined tensile force between the belt buckle and the fastener fitting being exceeded. Unlike prior art designs, the invention thus provides in addition to the stretchable member a separate traction means serving to transmit, at least in the fully stretched condition of the force limiter, a substantial part of the tensile forces acting between the belt buckle and the fastener fitting. Accordingly, the stretchable member can thus be dimensioned irrespective of the required maximum load capacity of the assembly unit.

Preferably, it is provided for that the traction means consist of at least one wire cable fixedly connected to the belt buckle and shiftably guided at the fastener fitting, and that attached to the end of the wire cable facing away from the belt buckle is a stopper which following a shift in position of the wire cable relative to the fastener fitting by a predetermined travel, comes into contact with the fastener fitting. Since a wire cable is particularly well suitable for transmitting tensile loads and, in addition to this, can be put to use cost-effectively, an assembly unit can be achieved by this configuration at comparatively little expense with which, irrespective of the existing stretchable member, particularly high loads can be transmitted between the belt buckle and the fastener fitting.

In accordance with a preferred embodiment of the invention it is provided for that two wire cables are used which are anchored to the frame of the belt buckle and that the end of the stretchable member facing the belt buckle is fixedly crimped to the wire cables. By making use of two wire cables the belt buckle can be positioned reliably in the desired orientation in the vehicle interior without necessitating additional expedients. Manufacturing the assembly unit in this configuration involves minimum expense since the wire cables merely need to be inserted in the guide of the fastener fitting and then simply requiring the end of the stretchable member facing the belt buckle to be fixedly crimped to the wire cables.

Advantageous aspects of the invention read from the sub-claims.

The invention will now be detailed with reference to various embodiments illustrated in the attached drawings in which:

FIG. 1 is a front view in perspective of a first embodiment of the assembly unit in accordance with the invention;

Figure 4:
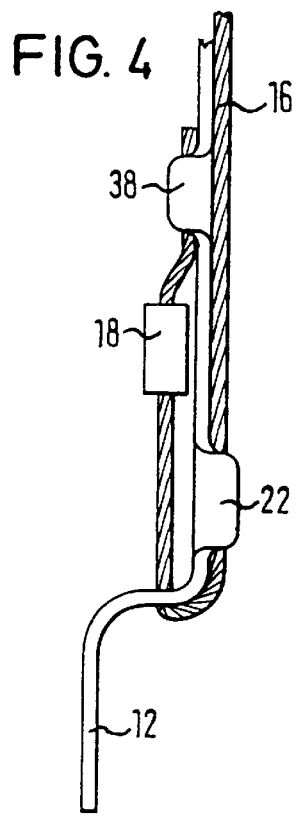
FIG. 4 is a side view of a detail of a third embodiment of the assembly unit.

Referring now to FIG. 1 there is illustrated schematically an assembly unit in accordance with a first embodiment of the invention. The assembly unit contains a belt buckle 10 into which an insert tongue of a vehicular seat belt system can be inserted and which is coupled to a fastener fitting 12 serving to secure the assembly unit to a vehicle (not shown). The belt buckle 10 contains in its interior a load-bearing frame (not shown) into which the loads of the seat belt are transmitted with the insert tongue inserted. Fixedly connected to the load-bearing frame are two wire cables 14, 16 onto the end of which a stopper 18 is pressed.

The fastener fitting 12 is provided with two guide lugs 20, 22 clasping the wire cables 14, 16. Following the end of the fastener fitting 12 provided with the guide lugs 20, 22 is a stretchable member 24. The latter comprises two annular stretch links 26, 28 integrally connected to each other between which, when desired, a predetermined breaking point 30 may be provided. Following the stretch link 28 are two arrester lugs 32, 34 fixedly crimped to the wire cables 14, 16. The two arrester lugs 32, 34 are configured and crimped to the wire cables 14, 16 such that they are able to transmit a maximum tensile force from the wire cables to the stretch links 26, 28 which is greater than the force needed to stretch the stretch links. Contrary to this, the lugs 20, 22 serving to guide the wire cables 14, 16 at the fastener fitting 12 are merely bent as far as is needed-to come into contact with the wire cables 14, 16 when lightly pretensioned; i.e. unlike the arrester lugs 32, 34 the lugs 20, 22 do not provide for securing the wire cables 14, 16 to the fastener fitting 12, they instead merely provide for a predetermined frictional force upon a relative movement between the wire cables 14, 16 and the fastener fitting 12.

Optionally a damping sleeve 36 may be arranged at the end of the wire cables 14, 16 adjacent the stopper 18.

When a tensile load is effective between the belt buckle 10 and the fastener fitting 12, three different phases can be observed. In a first phase in which the tensile force is less than a first critical force, no increase in length of the assembly unit occurs. The first critical force is composed of the force needed to stretch the stretch links 26, 28 and the force needed to overcome the friction between the lugs 20, 22 and the wire cables 14, 16.

In a second phase in which the first critical force is exceeded, the stretch links 26, 28 are stretched since they are entrained by the wire cables 14, 16 via the lugs 32, 34, the wire cables 14, 16 being pulled through the lugs 20, 22. After a predetermined increase in length either the optionally provided damping sleeve 36 or the stopper 18 comes into contact with the lugs 20, 22 so that the increase in length is limited. The tensile force achieved at this point in time represents a second critical force.

In a third phase after the second critical force has been exceeded, the stretch links 26, 28 are stretched and either the damping sleeve 36 or the stopper 18 is in contact with the lugs 20, 22. Any further increase in the tensile load results in no further increase in length.

The characteristic of increase in length versus effective tensile force can be set to practically any desired degree by designing the stretch links 26, 28 and the pretension of the lugs 20, 22 without this influencing the maximum transmittable tensile force between the belt buckle 10 and the fastener fitting 12.

Figure 2:
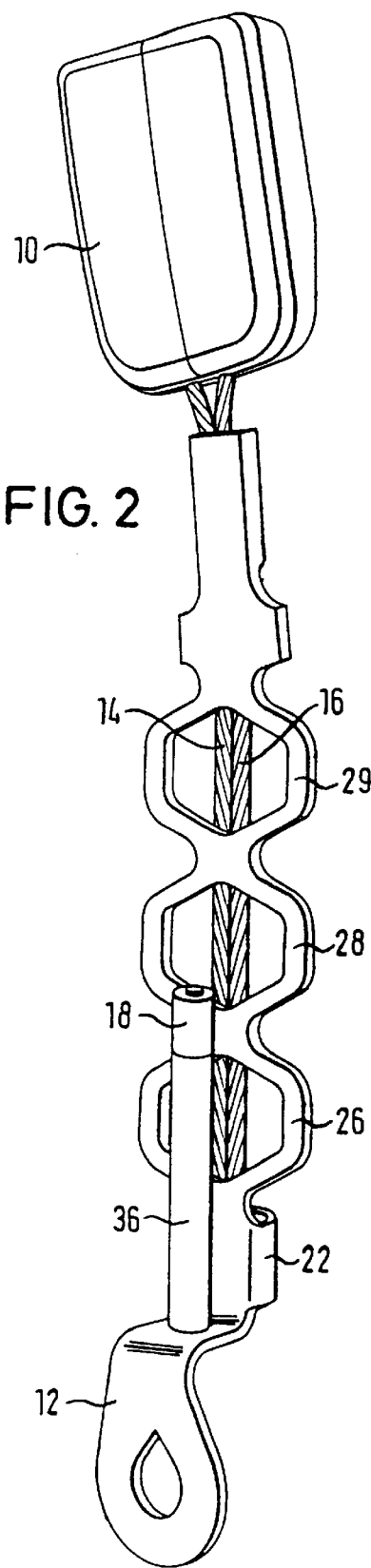
FIG. 2 is a rear view in perspective of a second embodiment of the assembly unit in accordance with the invention.
Figure 3:
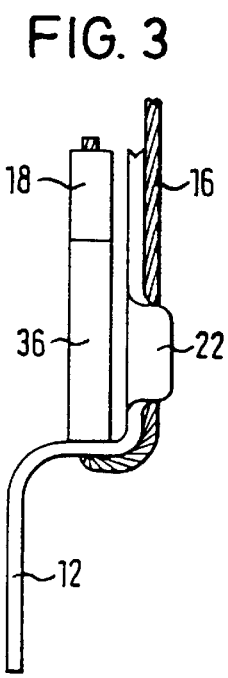
FIG. 3 is a side view of a detail of the assembly unit as shown in FIG. 2.

Referring now to FIGS. 2 and 3 there is illustrated schematically a second embodiment of the invention. This embodiment differs from the first embodiment by it employing three stretch links 26, 28, 29 instead of two stretch links as well as by the arrangement of the traction cables 14, 16 in the region of the fastener fitting 12. The traction cables 14, 16 are deflected through 180° at the fastener fitting 12 so that the stopper 18 is again oriented in the direction of the belt buckle. Due to the deflection any shift in position of the wire cables 14, 16 relative to the fastener fitting 12 is opposed by a resisting force composed, for one thing, of the wrap friction in the region of the fastener fitting 12 and, for another, of the flexural rigidity of the wire cables 14, 16. In this embodiment the damping sleeve 36 is already in contact with both the stopper 18 and the fastener fitting 12 in the resting position; i.e. it damping the relative movement between the wire cables 14, 16 and the fastener fitting 12 right from the start.

Referring now to FIG. 4 there is illustrated a detail of a third embodiment. Apart from the damping sleeve being missing, this third embodiment differs from the second embodiment in that the wire cables 14, 16 protrude beyond the stopper 18. Provided at the fastener fitting 12 are two lugs 38 which clasp the wire cables 14, 16 in the same way as the lugs 20, 22. Depending on how the lugs 38 are designed and the degree to which they are crimped to the wire cables 14, 16 they serve either merely to guide the deflected section of the wire cables or, in addition thereto, to provide a predetermined frictional force opposing any relative displacement between the wire cables 14, 16 and the fastener fitting 12.

What is claimed is:

1. An assembly unit comprising a belt buckle (10) for the insert tongue of a vehicular seat belt, a fastener fitting (12) for said belt buckle (10) and a force limiter between said belt buckle (10) and said fastener fitting (12), said force limiter containing a traction means (14, 16) fixedly connected to said belt buckle (10), movable relative to said fastener fitting (12) by a predetermined travel, and a stretchable member (24) coupled to said belt buckle (10) and said fastener fitting (12), which can be stretched by a predetermined tensile force between said belt buckle (10) and said fastener fitting (12) being exceeded, said traction means consisting of at least one wire cable (14, 16) fixedly connected to said belt buckle (10) and shiftably guided at said fastener fitting (12), and a stopper being attached to the end of said wire cable (14, 16) which stopper (18) contacting said fastener fitting (12) following a shift in position of said wire cable (14, 16) relative to said fastener fitting (12) by a predetermined travel said end of said wire cable (14, 16) protruding from said stopper (18) and being guided by two lugs (38) formed on said fastener fitting (12).

2. Apparatus comprising:

a vehicle seat belt buckle (10); and a fastener fitting (12) for said vehicle seat belt buckle (10); and a force limiter having a traction means (14, 16) connected to said vehicle seat belt buckle (10) and extending between said seat belt buckle (10) and said fastener fitting (12), and a stretchable member (24) having a predetermined tensile strength arranged in parallel to said traction means (14,16) and being coupled to said traction means (14,16) and said fastener fitting (12), said stretchable member (24) stretching in length when said predetermined tensile strength is exceeded, said traction means comprising at least one wire cable (14, 16) fixedly connected to said belt buckle (10) and shiftably guided at said fastener fitting (12), and a stopper (18) attached to the end of said wire cable (14, 16), said stopper, following a shift in position of said wire cable (14, 16) relative to said fastener fitting (12) by a predetermined travel, coming into contact with said fastener fitting (12), and at least two lugs (20, 22) against which said stopper (18) can come into contact guiding said wire cable (14, 16) at said fastener fitting (12).

3. The apparatus of claim 2 wherein said lugs (20, 22, 38) are pretensioned relative to said wire cable (14, 16).

4. Apparatus comprising:

a vehicle seat belt buckle (10); and a fastener fitting (12) for said vehicle seat belt buckle (10); and a force limiter having a traction means (14, 16) connected to said vehicle seat belt buckle (10) and extending between said seat belt buckle (10) and said fastener fitting (12), and a stretchable member (24) having a predetermined tensile strength arranged in parallel to said traction means (14,16) and being coupled to said traction means (14,16) and said fastener fitting (12), said stretchable member (24) stretching in length when said predetermined tensile strength is exceeded, said traction means comprising at least one wire cable (14, 16) fixedly connected to said belt buckle (10) and shiftably guided at said fastener fitting (12), and a stopper (18) attached to the end of said wire cable (14, 16), said stopper, following a shift in position of said wire cable (14, 16) relative to said fastener fitting (12) by a predetermined travel, coming into contact with said fastener fitting (12), said wire cable (14, 16) being deflected through about 180° in the region of said fastener fitting (12) and said stopper (18) coming into contact with said fastener fitting (12) at the point of deflection.

5. Apparatus comprising:

a vehicle seat belt buckle (10); and a fastener fitting (12) for said vehicle seat belt buckle (10); and a force limiter having a traction means (14, 16) connected to said vehicle seat belt buckle (10) and extending between said seat belt buckle (10) and said fastener fitting (12), and a stretchable member (24) having a predetermined tensile strength arranged in parallel to said traction means (14,16) and being coupled to said traction means (14,16) and said fastener fitting (12), said stretchable member (24) stretching in length when said predetermined tensile strength is exceeded, said traction means comprising at least one wire cable (14, 16) fixedly connected to said belt buckle (10) and shiftably guided at said fastener fitting (12), and a stopper (18) attached to the end of said wire cable (14, 16), said stopper, following a shift in position of said wire cable (14, 16) relative to said fastener fitting (12) by a predetermined travel, coming into contact with said fastener fitting (12), and a damping sleeve (36) arranged on said wire cable (14, 16) between said fastener fitting (12) and said stopper (18).

6. Apparatus comprising:

a vehicle seat belt buckle (10); and a fastener fitting (12) for said vehicle seat belt buckle (10); and a force limiter having a traction means (14, 16) connected to said vehicle seat belt buckle (10) and extending between said seat belt buckle (10) and said fastener fitting (12), and a stretchable member (24) having a predetermined tensile strength arranged in parallel to said traction means (14,16) and being coupled to said traction means (14,16) and said fastener fitting (12), said stretchable member (24) stretching in length when said predetermined tensile strength is exceeded, said traction means comprising at least one wire cable (14, 16) fixedly connected to said belt buckle (10) and shiftably guided at said fastener fitting (12), and a stopper (18) attached to the end of said wire cable (14, 16), said stopper, following a shift in position of said wire cable (14, 16) relative to said fastener fitting (12) by a predetermined travel, coming into contact with said fastener fitting (12), said two wire cables (14, 15) being anchored to the frame of said belt buckle (10) and an end (32, 34) of said stretchable member (24) being fixedly crimped to said wire cable (14, 16).

\* \* \* \* \*